July 31, 1945. N. A. NELSON 2,380,670
FISHING REEL
Filed Aug. 23, 1943 5 Sheets-Sheet 2
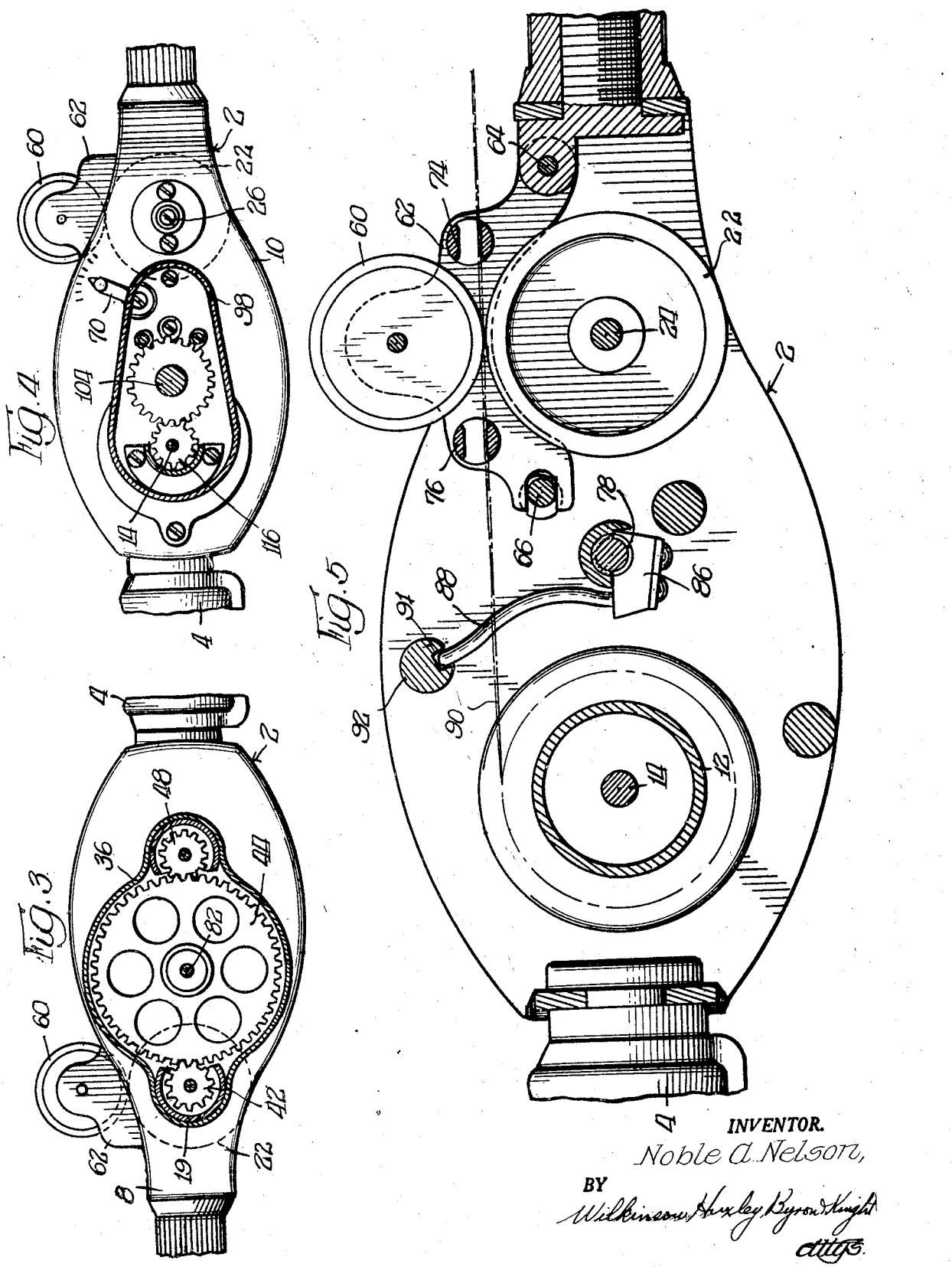
INVENTOR.
Noble A. Nelson,
BY Wilkinson, Huxley, Byron & Knight
attys.

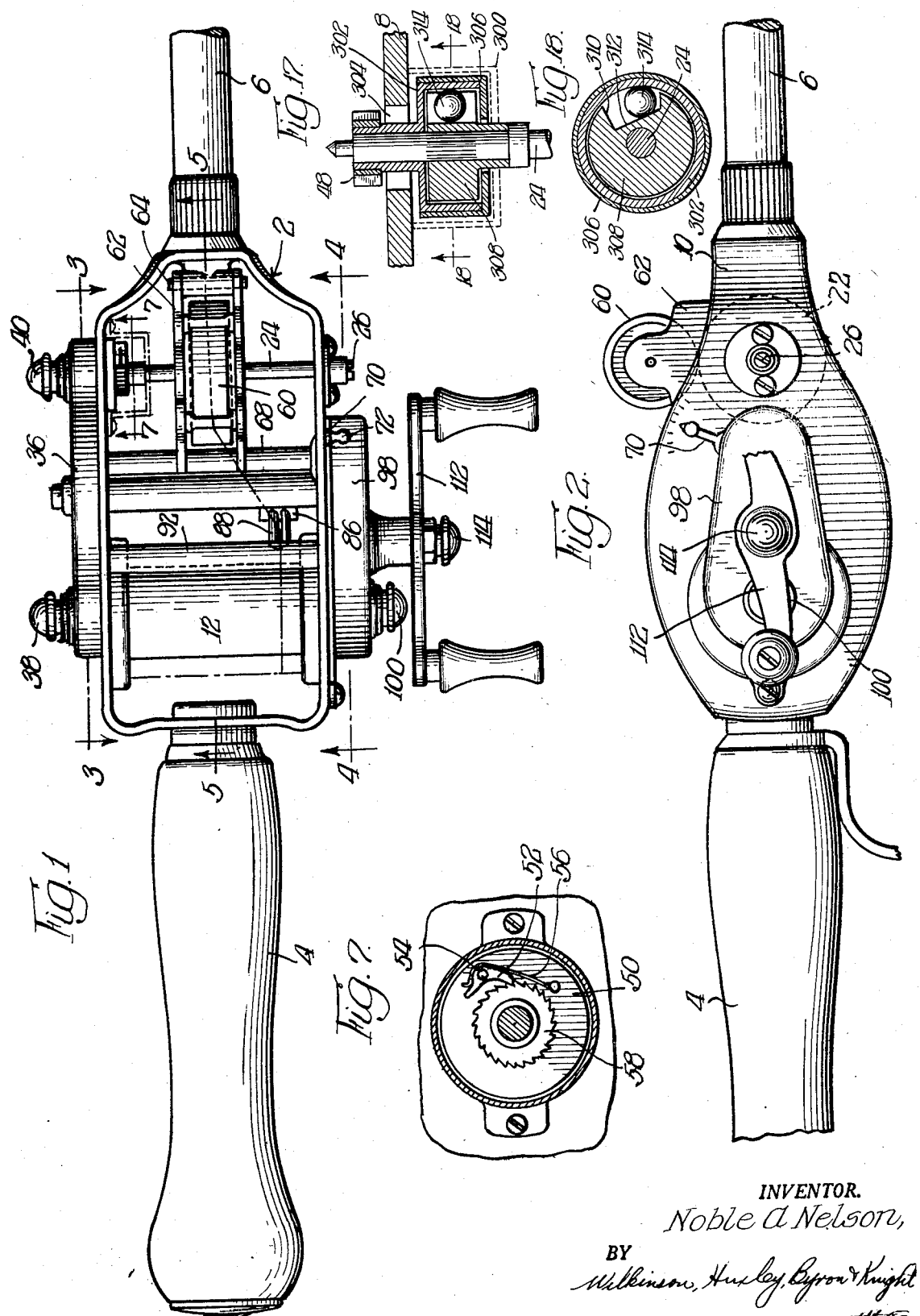

July 31, 1945.   N. A. NELSON   2,380,670
FISHING REEL
Filed Aug. 23, 1943   5 Sheets-Sheet 3
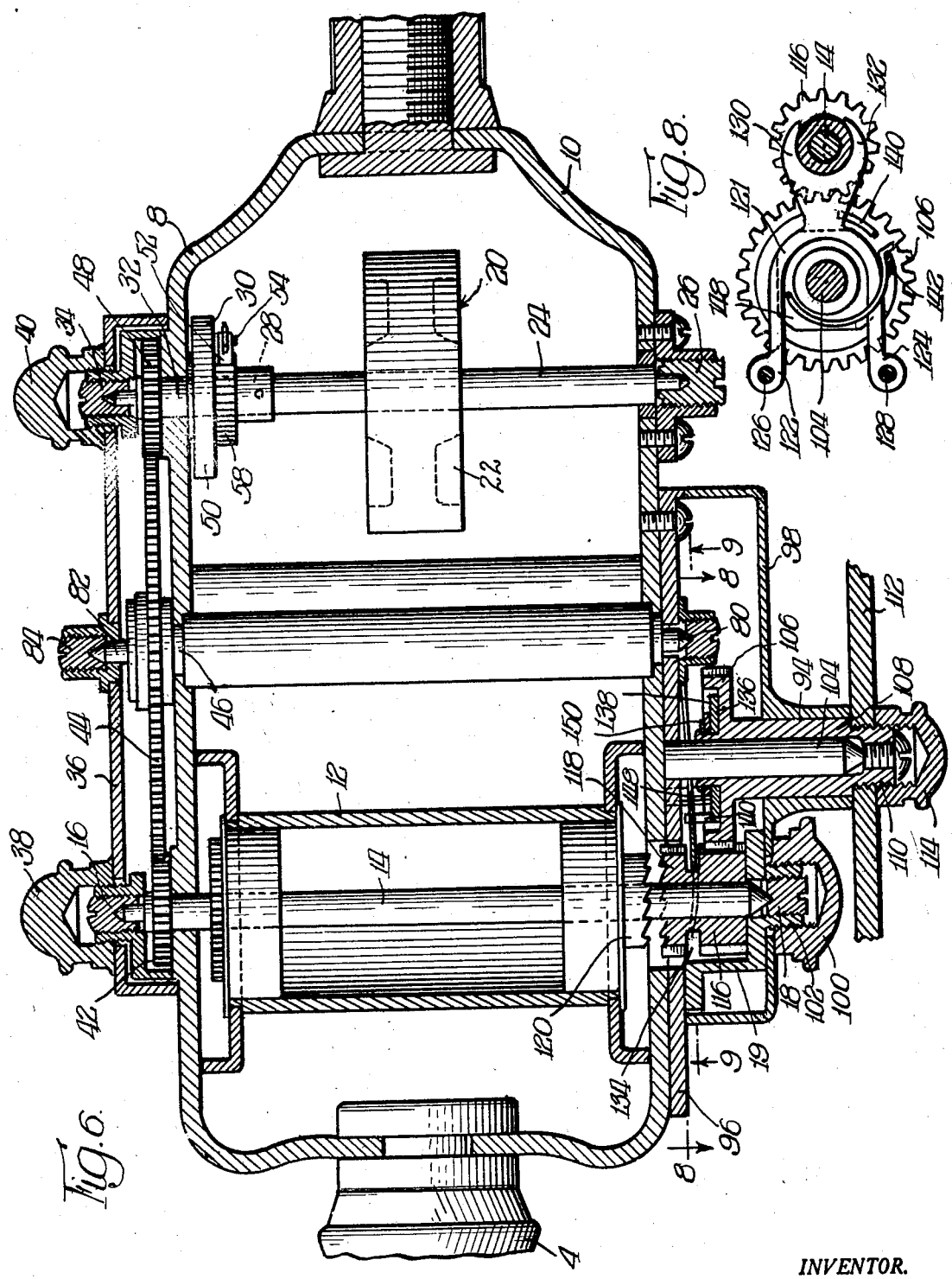
INVENTOR.
Noble A. Nelson,
BY
Wilkinson, Huxley, Byron Knight
attys.

July 31, 1945. N. A. NELSON 2,380,670
FISHING REEL
Filed Aug. 23, 1943 5 Sheets-Sheet 4
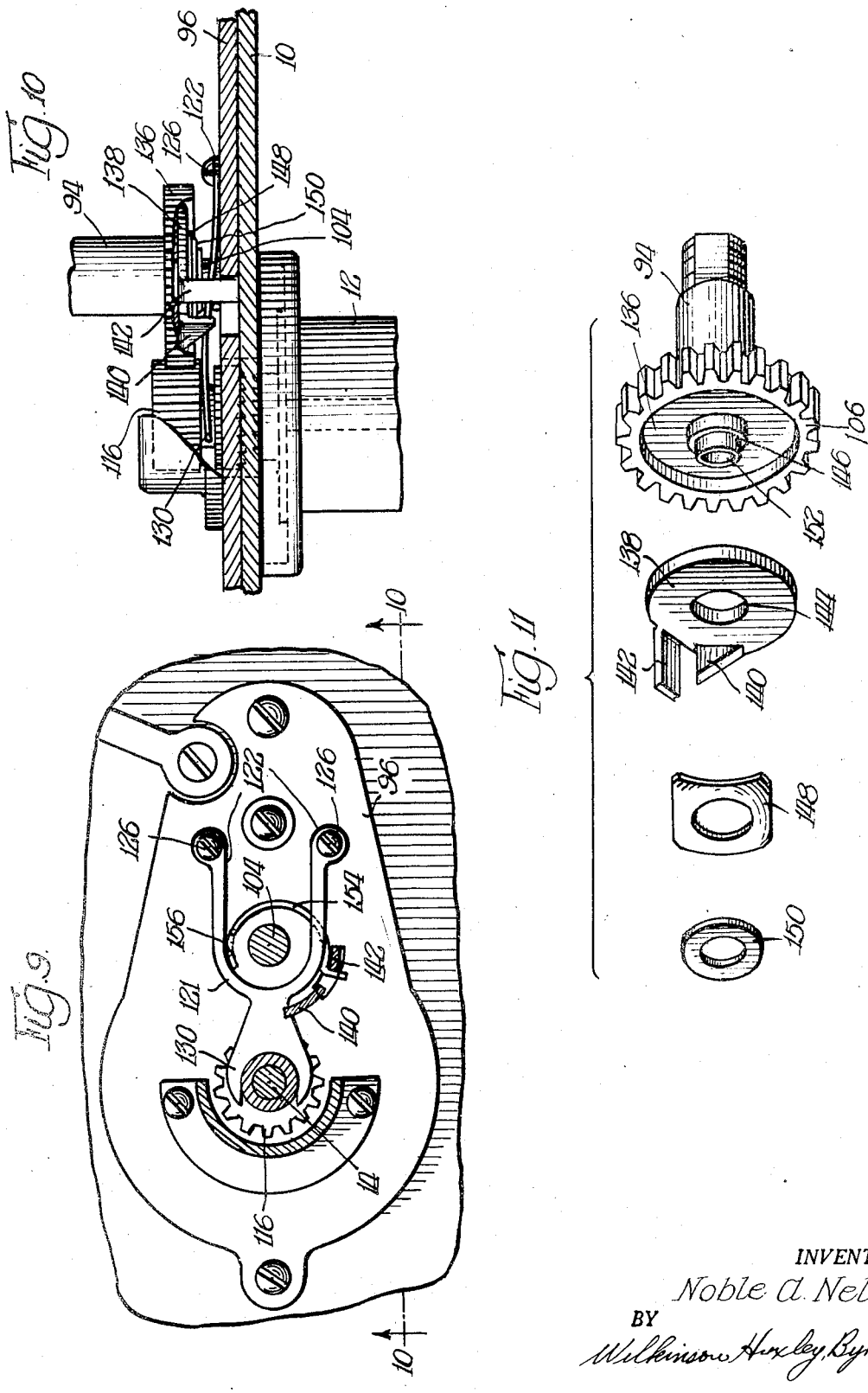
INVENTOR.
Noble A. Nelson,

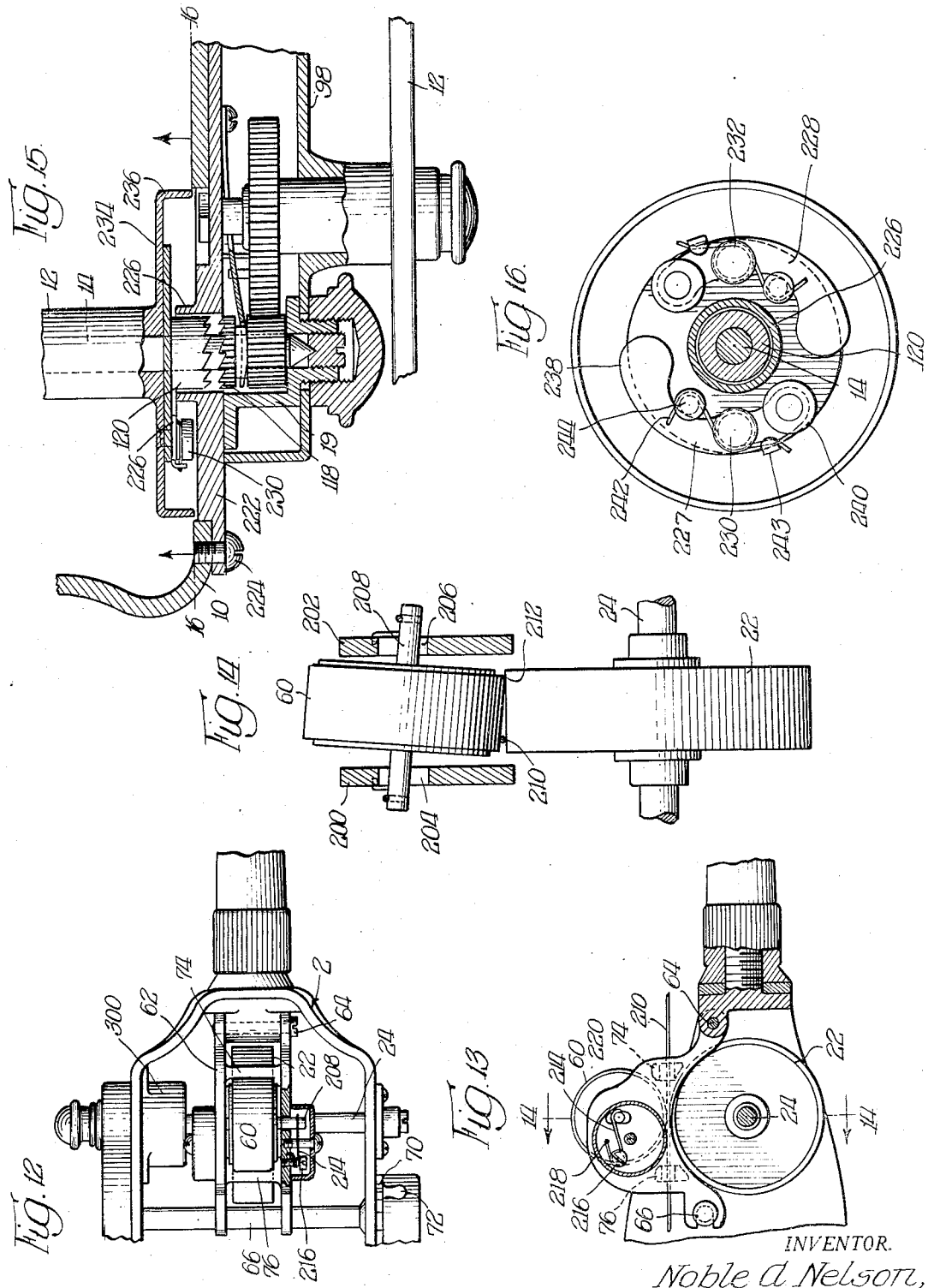

Patented July 31, 1945

2,380,670

UNITED STATES PATENT OFFICE 2,380,670

FISHING REEL

Noble A. Nelson, Chicago, Ill., assignor of one-fifth to Harold Freevol, one-fifth to Sam Smedberg, one-fifth to Howard Brandon, and one-fifth to Carl E. Anderson Application August 23, 1943, Serial No. 499,602

6 Claims. (Cl. 242—84.7)

The present invention relates to improvements in fishing reels; this application being a continuation in part of my application Serial No. 456,987, filed September 2, 1942, for "Fishing reels," now abandoned.

Among the objects of the present invention is to provide novel mechanism in a fishing reel which operates and functions in conjunction with a spool to prevent overrunning of the spool during a casting operation, thus eliminating entirely back-lash or entanglement of the line at the time the same is paid out during such casting operation.

Another object of the present invention is to provide a fishing reel of improved construction embodying mechanism which makes it unnecessary to apply pressure to the spool and/or line wound upon the same to prevent overrunning thereof during the casting operation.

More in particular the invention comprehends the incorporation of a line conveyor spaced in relation to the spool of the reel and embodying in its structure means for frictionally gripping the line to hold the line taut between the spool and said line conveyor to prevent its becoming entangled during the casting operation. Embodied in such assembly is means for driving the line conveyor in accordance with the movement of the spool so as to assure the taut condition of the line as hereinbefore set forth.

The present invention is further grounded upon the idea of forming the said line conveyor of two circumferentially cooperating rolls and to embody in the reel structure a driving connection between the spool and at least one of said rolls whereby the line is maintained taut therebetween.

More particularly, the invention contemplates the provision of a driving roll of substantially the same diameter as a full line spool whereby the circumferential speed of the roll conforms substantially to the lineal speed of the line under full line spool conditions, thus assuring lineal travel of the line through the line conveyor at a speed equal to or greater than the lineal speed of the line being paid out from the spool. The invention further contemplates the provision of a line conveyor which is so constructed and arranged as to permit slippage of the line during its outward travel from the said spool.

The invention is further predicated upon the provision of a one-way clutch connection between the line conveyor and its drive from the spool, whereby the line conveyor does not in any way affect the winding of the line upon the spool during the retrieving step in the casting operation.

The invention has the further object of incorporating into the structure hereinabove identified a level winding mechanism which, in reels of substantial width, assures the proper winding and unwinding of the line in respect to the spool.

A still further object of the present invention is to provide novel spool operating mechanism involving a releasable clutch connection with the spool, whereby the spool acts as a freely rotatable body upon its spindles during the casting operation.

More particularly, the present invention involves the provision of a spool operating mechanism which is effective in rotating a spool upon application of pressure to the handle formed as a part thereof, and which mechanism automatically operates to effect a disengagement with the spool upon release of pressure from the operating handle thereof.

Still another object within the purview of the present invention is to provide a novel spool operating mechanism to provide for free spool operation for the reel as hereinabove mentioned and incorporating the line conveyor and/or the level winding mechanism.

The present invention further contemplates an improved arrangement for the rolls of the line conveyor wherein one of said rolls is movably mounted to permit axial angular displacement thereof with respect to the other of said rolls to assure proper driving relation between the rolls under all conditions. More specifically, said roll is yieldably and floatingly mounted to permit frictional engagement thereof with the other of said rolls whereby the driving relation therebetween is secured irrespective of the position of the line frictionally gripped therebetween.

A still further object of the present invention is to provide novel means for regulating the speed of rotation of the spool during a casting operation, such means involving the use of one or more governors which may have cooperative relation with the frame or an element associated therewith to prevent overdriving of the spool during the initial casting operation and to prevent line being shot outwardly beyond the first guide of the rod which might otherwise cause back-lash or tangling of the line.

Other objects, features, capabilities and advantages are comprehended by the invention, as will later appear and as are inherently possessed thereby.

Referring to the drawings—

Figure 1 is a top plan view of a reel made in accordance with the present invention;

Figure 2 is a view in side elevation of the reel shown in Figure 1 of the drawings;

Figure 3 is a view, partly in elevation and partly in section, taken in the plane represented by the line 3—3 of Figure 1;

Figure 4 is a view, partly in elevation and partly in section, taken in the plane represented by line 4—4 of Figure 1 of the drawings;

Figure 5 is an enlarged view, partly in elevation and partly in section, taken in the plane represented by line 5—5 of Figure 1;

Figure 6 is an enlarged horizontal sectional view of the reel shown in Figure 1;

Figure 7 is a sectional view taken in the plane represented by line 7—7 of Figure 1 of the drawings;

Figure 8 is a detached sectional view taken in the plane represented by line 8—8 of Figure 6;

Figure 9 is a detached sectional view taken in the plane represented by line 9—9 of Figure 6;

Figure 10 is a fragmentary cross-sectional view of the mechanism shown in Figure 9 of the drawings and taken in the plane substantially represented by line 10—10 of said figure;

Figure 11 is an exploded view of certain of the operating parts for the mechanism more particularly shown in Figures 8, 9 and 10;

Figure 12 is a fragmentary top plan view of a reel such as shown in Figure 1 of the drawings, but embodying modifications in the mounting for the idler roll as more particularly shown in cross section of this figure;

Figure 13 is a fragmentary view in section of the reel shown in Figure 12 of the drawings;

Figure 14 is a fragmentary view in cross section taken in the plane represented by line 14—14 of Figure 13 of the drawings;

Figure 15 is a fragmentary view partly in plan and partly in section of a reel conforming substantially to that shown in Figure 6 of the drawings, but embodying further modified constructions in accordance with the present invention;

Figure 16 is a view in cross section taken in the plane represented by line 16—16 of Figure 15 of the drawings;

Figure 17 is a fragmentary view in section of a preferred form of clutch mechanism for the reel structures as herein disclosed on the drawings, this form of clutch being particularly shown in Figure 12 of the drawings; and Figure 18 is a view in section taken in the plane represented by the line 18—18 of Figure 17 of the drawings.

Referring now more in detail to the drawings, a reel embodying the improvements according to the present invention is represented generally by the reference numeral 2 and which reel is formed as an element in an assembly which further includes a handle 4 and a ferrule 6 adapted to receive the end of a casting rod which is socketed therein. More particularly the said reel embodies a frame constituted by the plate elements 8 and 10 which have their ends inturned to form a means for mounting the handle 4 and the ferrule 6 as hereinbefore described. The said reel is further constituted by a spool 12 fitting within the frame members 8 and 10 and which is provided with the spindle 14 journaled as at 16 in the plate 8 and as at 18 in the bearing structure 19 connected to plate 10. The said spool is adapted to receive line used in fishing, to tore the same and to facilitate the paying out of the same during the casting operation.

As is well known at the present time, conventional fishing reels are subject to certain objections, one being the fact that because of overrun of the spool during the casting operation the line becomes snarled and entangled, causing considerable difficulty to the user in straightening the line to permit further casting therewith.

The present invention, as one of its principal objects, has to do with improved mechanism to prevent overrunning of the spool and accordingly such mechanism acts to completely avoid backlash of the line on the spool during the casting operation. The reel 2 in the present embodiment is shown as including a line conveyor generally represented as 20, constituted in part by a roll 22 mounted upon a shaft 24 disposed transversely of the reel, the said shaft 24 being journaled as at 26 in the frame member 10 and as at 34 in the side plate or frame member 8. Enclosed within the cap 36 secured to the side plate 8 by means of the thumb nuts 38 and 40, is a driving connection between the spool and a clutch 30, which comprises a pinion 42 secured to the spindle 14 and which meshes with a gear 44 secured to shaft 46, and which gear 44 meshes with a pinion 48 of the clutch mechanism 30.

The clutch mechanism 30 is more clearly disclosed in Figure 7 as being constituted by a driving disc 50 disposed on the inside face of the frame element 8 and connected to the pinion 48 by the hub 32 journaled in said element 8. The driving disc 50, hub 32 and pinion 48 are rotatably mounted as a unit upon the shaft 24. Mounted upon the inside face of the disc by the pivot 54 is a pawl or dog 52 which, through the medium of a spring 56 is urged into cooperative relation with the teeth of the ratchet gear 58. The ratchet gear 58 is formed with a sleeve 28 securely mounted upon the shaft 24 for rotation therewith. The said clutch mechanism as shown is so arranged as to constitute a one way drive for the roll 22 during rotation of the spool to pay out line from the reel, but which clutch mechanism permits rotation of the spool 12 in the opposite direction to retrieve the line without directly driving the roll 22, all as will be hereinafter more fully explained.

The said line conveyor is further constituted by an idler roll 60 mounted in bracket 62 which is pivoted to the frame as at 64 and is adjustably mounted on the eccentrics 66 of a shaft 68 extending transversely of the reel, and which is mounted in frame members 8 and 10, all as clearly shown in the drawings. Connected to one end of the shaft 68 is an adjusting lever 70 which can be conveniently rotated through the knob 72 to rotate the shaft 68 and its eccentrics 66, whereby the bracket 62 is adjusted about its pivot point 64. Through the adjustment as hereinabove described it is possible to move the roll 60 bodily with respect to roll 22 to increase or decrease the space therebetween for accommodating lines of various weight and size so that the proper frictional gripping of any one line may be accurately adjusted. The said bracket 62 is further provided with the forward and rear guiding elements 74 and 76 which cooperate with the level winding mechanism to be presently more fully described.

While the invention in its broadest aspect contemplates the provision of a combination as hereinabove described, nevertheless where the reel is rather wide, as is conventional in present types of casting reels, the said invention contemplates the use of level winding mechanism in conjunction with the structure as hereinbefore set forth.

According to the present invention, the level winding mechanism includes the shaft 46 disposed transversely of the reel and which is provided with conventional worm slots 78. Said shaft is journaled as at 80 in the frame member 10 and at 46, and as at 84 in the cap 36 and providing a mounting for the gear 44 of the driving connection between the spool and line conveyor. The said level winding mechanism further includes the carriage 86 formed with a conventional pawl operable within the worm slots 78 and which carriage provides a mounting for a line guide 88 through which the line 90 from the spool extends to enter into and through the guides 76 and 74 and between the rolls 22 and 60. The line guide 88, through the medium of the double worm slots 78 and co-operating pawl, moves transversely of the reel to guide the line 90 and is operable during such movement within the guide slot 91 formed in the transverse spacing element 92.

While the invention is not limited in respect to the specific diameters of the rolls 22 and 60 or the ratio between the said diameters, nevertheless it has been found that efficient results can be secured by making the diameter of the roll 22 substantially equal to the diameter of a full line spool. That is to say, the diameter of the roll 22 is equal substantially to the diameter of a normal amount of line wound upon the spool 12 for normal fishing undertakings. The roll 60 need not be of any particular diameter and any diameter may be selected which will give the desired results. As will be clearly apparent, under full line spool conditions the lineal speed of the rolls 22 and 60 is substantially equal to the lineal speed of the line on the spool 12. During the paying out of line in a casting operation the line diameter upon the spool 12 decreases, and since the pinions 42 and 48 have equal pitch diameters, the lineal speed of the line through the line conveyor is at all times substantially the same or greater than the lineal speed of the line leaving the spool 12. This condition is desirable in order to maintain the line between the line conveyor and the spool taut under such circumstances, thus rendering it impossible to secure back-lash conditions with the resulting entanglement of the line on the spool 12.

During the retrieving of line the clutch 30 comes into play, allowing the spool and its driving connection to the roll 60 to over-drive the line conveyor to permit the proper winding of line upon the spool. Thus during the retrieving operation the pawl 52 slides over the teeth of the ratchet gear 58 so that the line being wound upon the spool is maintained in taut condition between the line conveyor and the said spool.

As will be noted, the drive for the level winding mechanism is taken off directly from the driving connection between the spool and line conveyor, and which drive is on the same side as the drive for the line conveyor and spool, which arrangement facilitates proper drive of the level winding mechanism for varying weights of line. For example, it has been clearly appreciated in present day reel structures that the speed of the guide 88 transversely of the reel should be different for each size line, but no provision has ever been made heretofore in a reel structure to facilitate the incorporation or substitution of drive elements which would give varying rates of travel to the level winding guide, such as 88, of the present assembly. In the present reel structure, however, the rate of travel of the guide 88 may be adjusted as desired, merely by the substitution of gears in the driving connection for the line conveyor 20. The gear ratio between the gears 42, 44 and 48 for different reels may be varied, so that the guide 88 of the level winding mechanism may be driven at any speed desired to accommodate the particular weight and size of line being used. In this way the line used with any particular reel will be properly wound upon the reel under all conditions, and the spool 12 will, under such circumstances, hold a maximum amount of line of any given weight and size. This change in gear ratio for the driving connection between the spool and line conveyor does not in any way affect the functioning of the line conveyor.

The present reel structure embodies in its assembly novel operating mechanism for the spool 12. The said mechanism is generally represented as 94, and is formed as a unit attached to the plate 96 secured to the frame 10 and which includes the bearing housing 19 and journal 18 as hereinbefore referred to. This operating unit is enclosed by a housing 98 secured in place through the medium of a cap screw 100 threadedly engaging the threaded extension 102 of the bearing housing 19.

The said operating mechanism involves a stub shaft 104 connected to the plate 96 and which has mounted thereon a gear 106 provided with the threaded sleeve extension 108 which embraces the shaft 104. The threaded extension 108 is formed with a non-circular shouldered part 110 adapted to receive the handle 112 which is secured thereto through the medium of the cap screw 114. The gear 106 is adapted to mesh with a pinion 116 rotatably and slidably mounted upon the end of the spindle shaft 14 and which pinion is formed integral with a clutch element 118. The clutch element 118 is formed with teeth on its inner face adapted to mesh with similar teeth on the face of a clutch element 120 connected to the spool 12, thus providing for a driving connection between the handle 112 and the spool 12.

The operating mechanism is so constructed and arranged that the clutch element 118 engages the clutch element 120 upon application of pressure to the handle 112 and to automatically become disengaged therefrom upon release of pressure on the handle 112. This operation is effected through the provision of a leaf spring member 121 bifurcated to provide the arms 122 and 124 at one end which straddle the shaft 104 and are connected to the plate 96 by screws or the like 126 and 128. The other end of the spring element 121 is bifurcated to form the arms or prongs 130 and 132 adapted to enter into the slot 134 provided between the pinion 116 and clutch element 118 and to embrace the intermediate hub formed therebetween, the said spring being constructed and so mounted on the plate 96 as to normally urge the clutch element 118 out of engagement with the clutch element 120. Accordingly, during casting operation the spool operating mechanism is wholly disengaged from the spool 12 so as to provide a free running spool during the paying out of line from the reel.

However, upon initiating a retrieving operation, the spring 121 is moved inwardly to effect an engagement between clutch elements 118 and 120 whereby the spool 12 may be rotated to retrieve the line. The mechanism herein disclosed for effecting this movement of the spring 121 is incorporated within a recess 136 formed in the face of the gear 106, all as clearly shown in Figure 11 of the drawings. The said mechanism comprises a disc 138 formed with a cam 140 and a lug 142 projecting from one face thereof adjacent its periphery, which disc 138 is formed with an opening 144 fitting over the hub 146 projecting into the recess 136. Likewise mounted over the hub 146 is a concave-convex spring washer 148 engaging the face of the disc 138, the entire assembly being held in position through the medium of a washer 150 which is engaged by the spun end 152 of the hub 146 to thereby hold the assembly within the recess 136. The disc 138 frictionally engages the end wall of the recess 136 so that in any position of the disc 138 the gear 106 is free to rotate to operate the pinion 116 and, in turn, the spool 12.

The frictional engagement between the disc 138 and the gear 106 is such that upon initial movement of the handle 112 the cam surface 140 is moved into contacting engagement with the spring 121 to force the same inwardly and to effect engagement between the clutch elements 118 and 120. Continued movement of the handle 112 operates the gear 106 for rotating the spool 12. Upon release of pressure on the handle 112 the disc 138, together with the gear 106, is moved under the impulse of the spring 121 to effect a disengagement of the clutch elements 118 and 120 through the medium of a spring 154 having one end engaging the lug 142 and having its other end mounted as at 156 in the plate 96.

It, therefore, will be clearly apparent that the spool operating mechanism is entirely disengaged from the spool through the operation of the elements as immediately above described, so that the spool is wholly and totally independent of such mechanism during the casting operation. However, the said operating mechanism is readily manipulated to effect the necessary engagement of the clutch elements 118 and 120 so that the line may be retrieved upon the spool 12 as the same is rotated.

If desired, the reel assembly as hereinbefore described may include the modified structure shown in Figures 12, 13 and 14 to assure proper frictional driving relation between the driving and idler rolls. Since the reel construction according to Figures 12, 13 and 14 conforms substantially to the reel of Figures 1–11, inclusive, like reference numerals are applied to similar elements. In this modified form of reel construction, however, the idler roll 60 is mounted with respect to the bracket 62 so as to secure a "floating" relation for the same with respect to the driving roll 22. In order to secure a mounting for the idler roll 60 to permit axial angular displacement with respect to the driving roll 22, the bracket 62 has its side elements 200 and 202 formed with elongated slots 204 and 206, respectively, for receiving the journal shaft 208 of the idler roll 60. As clearly seen in Figure 14, the idler roll 60 is angularly disposed with respect to the roll 22 by virtue of the fact that the line 210 is frictionally gripped by the two cooperating rolls. Because of the floating mounting of the idler roll 60 with respect to the roll 22, said idler roll 60 is enabled to frictionally grip the roll 22, as at 212, which would otherwise not be possible with a fixed journal bearing therefor when a line, such as 210, is disposed therebetween. This form of journal mounting for the shaft 208 permits engagement of the idler roll 60 with the driving roll 22 under all conditions and irrespective of the position of the line 210 in respect to either of the two rolls.

In order to secure proper frictional driving relation of the idler roll 60 with the driving roll 22, as well as the line 210, spring elements, such as 214, are mounted on elements 200 and 202, each consisting of a spring wire coiled around a pin 216, the said spring wire having one of its ends connected by means of an opening to its associated bracket element, as at 218, and having its other end 220 embracing the shaft 208. Such spring elements normally urge the idler roll 60 into its cooperative relation with the line 210, as well as the driving roll 22.

In addition to the incorporation of the improved structure as shown in Figures 12, 13 and 14, a reel such as disclosed in Figures 1–11 may further include a governor mechanism such as shown in Figures 15 and 16. Reel parts shown in Figures 15 and 16, with a few exceptions, conform substantially to corresponding parts of the reel previously described and, accordingly, like reference numerals are used to identify these corresponding parts.

In the reel assembly of Figures 15 and 16, however, the frame structure is slightly modified, to include the plate 222 secured, as by means of one or more screws 224, to the frame element 10 and which plate is formed with an annular and inwardly disposed flange 226 surrounding or embracing the clutch element 120 of the spool 12.

Heretofore, difficulty has been experienced during the initial movement of a casting operation by virtue of the fact that the speed of the spool is uncontrolled and, accordingly, there is a tendency for the line to shoot forwardly beyond the first guide of the rod which may, under certain circumstances, cause difficulty in properly paying out the line from the rod during a casting operation. The present invention further includes as a novel feature of construction suitable means for controlling the spool during the initial movements of a casting operation to prevent the line from shooting forwardly as indicated and which means functions substantially identically to the "thumbing" of a spool which, as all casters recognize, is an essential and vital part of a proper cast, and particularly so at the time of the initial casting movement.

Such means, as illustrated in Figures 15 and 16, comprises opposed governor elements 227 and 228 of general curved formation pivoted as at 230 and 232, respectively, to the end wall 234 of the spool 12 and being enclosed within the space formed by the annular flange 236 of this end wall construction and the closure plate 222 in opposed relation thereto. Each of these governors is of similar construction and operates in the same manner, the same involving the enlarged end 238 on one side of the pivot point, such as 230, and having a frictional head or element 240 disposed in embracing relation to the flange 226 and adapted to frictionally engage the same. As will be clearly appreciated, these governors are operated under the influence of centrifugal force after the spool has attained a certain speed, at which time the heads 240 are moved inwardly into frictional engagement with the flange 226 to regulate the speed of the reel. This action is particularly desirable during the initial stages of a casting operation when the speed of the reel is greatest and at which time overrunning of the reel, unless controlled, may cause tangling of the line, as hereinbefore mentioned.

In order to maintain the governors in disengaged relation to the flange 226, springs 242 are provided, which having the central portion thereof coiled about the pivot points for the governors and each having one end secured to the governor as at 243 and the other end secured as at 244 to the end wall 234 of the spool.

As hereinbefore set forth, such control means in the form of one or more governors as disclosed in Figures 15 and 16 is particularly effective in making casting "fool proof" and, as can be readily appreciated, such governors may be of any desired weight and size to control the spool to any degree desired. By providing variations in such governors, the length of cast, as well as the control of the speed of the spool, is assured.

While the ratchet type of clutch mechanism disclosed in Figure 1 of the drawings has been found satisfactory in permitting overdrive of the rolls of the line conveyor with respect to the driving connection between the same and the spool, nevertheless it has been found much more satisfactory to provide a ball clutch such as shown at 300 in Figure 12 of the drawings and more particularly shown in Figures 17 and 18. This ball clutch comprises a housing formed in part by the ball retaining case 302 which extends through an opening 304 formed in the frame 8 and which has mounted thereon the pinion gear 48 of the driving connection between the roll 22 and the spool 12. The housing further includes the cover element 306, and enclosed within said housing is a clutch plug 308 pressed onto the shaft 24 in order to secure a driving relation between the said shaft and the plug 308. The plug 308 is formed with a peripheral slot 310 having a cam surface 312 and which slot is adapted to receive a ball clutch element 314 which is confined therein by the casing 302. This ball clutch is so designed as to cause the ball clutch element 314 to become wedged between the casing 302 and the cam surface 312 when the line is paid out from the spool 12, but to release the wedging engagement of the clutch element 314 with the casing 302 and wedge surface 312 when retrieving line onto the spool after a casting operation, thus permitting overdrive of the roll 22 with respect to the driving connection between the spool 12 and said roll. The ball type clutch mechanism has certain advantages over the ratchet type of clutch mechanism hereinbefore described in that the same is noiseless at all times, is positive in its operation and operates with less wear on the cooperating parts thereof than is experienced in the clutch mechanism of the previously described embodiment.

While I have herein described and upon the drawings shown an illustrative embodiment of the invention, it is to be understood that the invention is not limited thereto but may comprehend other constructions, arrangements of parts, details and features without departing from the spirit of the invention.

What is claimed is:

1. A fishing reel comprising a frame, a spool operatively mounted for rotation in said frame, a line conveyor comprising opposed rolls spaced from said spool and adapted to frictionally grip line at all times while the same is payed out from and retracted onto said spool, guide elements on opposite sides of said rolls and disposed with respect to said spool so that the fishing line at all times is payed out from said spool and through said guide elements and between said rolls in a plane substantially parallel to the axis of said spool, a driving connection between said spool and at least one of said rolls, and said drive having a clutch.

2. A fishing reel comprising a frame, a spool operatively mounted for rotation in said frame, means on one side of said frame for operating said spool, a line conveyor comprising opposed rolls spaced from said spool and adapted to frictionally grip line from said spool, level winding mechanism for guiding said line onto and off of said spool including a reversely threaded shaft, and a driving connection on the other side of said frame between said spool and at least one of said rolls, said driving connection comprising relatively small pinion gears operatively mounted with respect to said spool and said roll and a relatively large intermediate gear meshing with said pinion gears and mounted on said shaft for operating said level winding mechanism.

3. A fishing reel comprising a frame, a spool operatively mounted for rotation in said frame, a line conveyor comprising opposed rolls spaced from said spool and adapted to frictionally grip line from said spool, level winding mechanism for guiding said line onto and off of said spool including a reversely threaded shaft, and a driving connection between said spool and at least one of said rolls, said drive having a clutch, said driving connection comprising relatively small pinion gears operatively mounted with respect to said spool and said roll and a relatively large intermediate gear meshing with said pinion gears and mounted on said shaft for operating said level winding mechanism.

4. A fishing reel comprising a frame, a spool operatively mounted for rotation in said frame, a line conveyor comprising opposed rolls spaced from said spool and adapted to frictionally grip line from said spool, guide elements on opposite sides of said rolls and disposed with respect to said spool so that the fishing line at all times is payed out from said spool and through said guide elements and between said rolls in a plane substantially parallel to the axis of said spool, drive means disposed on one side only of said frame and interconnecting said spool and at least one of said rolls, clutch mechanism for said drive means, and a level winding mechanism for guiding said line onto and off of said spool including a reversely threaded shaft, said drive means comprising relatively small pinion gears operatively mounted with respect to said spool and said roll and a relatively large intermediate gear meshing with said pinion gears and mounted on said shaft for operating said level winding mechanism.

5. In a reel, the combination of a frame, a spool having spindles journaled in said frame, operating mechanism for said spool including a gear train, said gear train comprising a driving gear and a driven gear movable axially with respect thereto, clutch mechanism between said gear train and spool normally engaged and disengaged by said movable gear, spring means for normally holding said clutch in disengaged relation whereby said spool is rotatable on said spindles free from said operating mechanism, means frictionally associated with said driving gear for controlling operation of said last-named means, and spring means for controlling operation of said last-named means.

6. A fishing reel comprising a frame, a spool operatively mounted for rotation in said frame, a line conveyor comprising opposed rolls spaced from said spool and adapted to frictionally grip line from said spool therebetween, a driving connection between said spool and one of said rolls, and means for mounting the other of said rolls to permit axial angular displacement thereof with respect to said first named roll, said means including means for maintaining at all times said frictional engagement with line extending from said spool.

NOBLE A. NELSON.